United States Patent [19]
Hirota et al.

[11] Patent Number: 5,934,072
[45] Date of Patent: Aug. 10, 1999

[54] EXHAUST GAS PURIFYING DEVICE FOR ENGINE

[75] Inventors: Shinya Hirota, Susono; Toshiaki Tanaka, Numazu; Tatsuji Mizuno, Yokohama, all of Japan

[73] Assignee: Toyota Jidosha Kabushiki Kaisha, Toyota, Japan

[21] Appl. No.: 09/019,552

[22] Filed: Feb. 6, 1998

[30] Foreign Application Priority Data

Feb. 26, 1997 [JP] Japan ................................... 9-042488

[51] Int. Cl.⁶ ....................................................... F01N 3/10
[52] U.S. Cl. ............................... 60/301; 60/291; 60/292; 60/280; 60/278; 60/287
[58] Field of Search ............................. 60/274, 286, 287, 60/291, 292, 280, 278, 301

[56] References Cited

U.S. PATENT DOCUMENTS

| | | | |
|---|---|---|---|
| 5,233,831 | 8/1993 | Hitomi et al. | 60/284 |
| 5,331,809 | 7/1994 | Takeshima et al. | |
| 5,365,734 | 11/1994 | Takeshima | |
| 5,406,790 | 4/1995 | Hirota et al. | 60/276 |
| 5,771,686 | 6/1998 | Pischinger et al. | 60/274 |
| 5,845,486 | 12/1998 | Yamashita et al. | 60/274 |

FOREIGN PATENT DOCUMENTS

| | | |
|---|---|---|
| 0 286 967 | 10/1988 | European Pat. Off. |
| 195 22 165 | 12/1995 | Germany. |
| 195 43 219 | 12/1996 | Germany. |
| 60-019910 | 2/1985 | Japan. |
| A-63-283727 | 11/1988 | Japan. |

*Primary Examiner*—F. Daniel Lopez
*Assistant Examiner*—Binh Tran
*Attorney, Agent, or Firm*—Oliff & Berridge, PLC

[57] ABSTRACT

An exhaust gas purifying device for an engine comprises an exhaust gas purifying catalyst arranged in the exhaust passage. The catalyst is capable of reducing $NO_X$ in the catalyst in the oxidizing atmosphere, and comprises a reducing agent adsorbent adsorbing a reducing agent in the inflowing exhaust gas therein when the pressure in the adsorbent becomes higher, and desorbing the adsorbed reducing agent therefrom when the pressure in the adsorbent becomes lower. An exhaust gas control valve is disposed in the exhaust passage downstream of the catalyst. When both the engine load and the engine speed are low, the opening of the valve is made smaller to increase the pressure in the catalyst. At this time, hydrocarbon is fed to the catalyst, and is then adsorbed in the catalyst. When the engine load or the engine speed becomes high, or the cumulative amount of hydrocarbon fed to the catalyst becomes larger than a predetermined amount, the valve is made fully open to reduce the pressure in the catalyst. At this time, the adsorbed hydrocarbon is desorbed from the catalyst, and then reduces $NO_X$ in the catalyst.

24 Claims, 14 Drawing Sheets

EXHAUST GAS PURIFYING DEVICE FOR ENGINE

BACKGROUND OF THE INVENTION

1. Field of the Invention

The present invention relates to an exhaust gas purifying device for an engine.

2. Description of the Related Art

Japanese Unexamined Patent Publication No. 63-283727 discloses an exhaust gas purifying device for an engine in which an exhaust gas purifying catalyst is arranged in an exhaust passage of the engine, the catalyst being capable of reducing nitrogen oxide $NO_X$ included in the inflowing exhaust gas in an oxidizing atmosphere, and in which a reducing agent (hydrocarbon) is secondarily fed to the exhaust passage upstream of the catalyst, to thereby purify $NO_X$ in the catalyst using the hydrocarbon.

It is well known that a catalyst having a porous structure, such as a zeolite catalyst, adsorbs and desorbs hydrocarbon. Thus, $NO_X$ could be reduced in the catalyst by both hydrocarbon in the inflowing exhaust gas and that desorbed from the catalyst. However, the inventors of the present application have found that the $NO_X$ reduction by hydrocarbon desorbed from the catalyst is superior than that by hydrocarbon in the inflowing exhaust gas. Accordingly, in the case where the catalyst has the hydrocarbon adsorption and desorption function as mentioned above, $NO_X$ is sufficiently reduced by causing the catalyst to adsorb a large amount of hydrocarbon therein, or by causing the catalyst to desorb a large amount of hydrocarbon therefrom.

SUMMARY OF THE INVENTION

An object of the present invention is to provide an exhaust gas purifying device capable of increasing an amount of hydrocarbon adsorbed in the catalyst and that desorbed from the catalyst, to thereby purify $NO_X$ sufficiently.

According to the present invention, there is provided an exhaust gas purifying device, for an engine having an exhaust passage, comprising: an exhaust gas purifying catalyst arranged in the exhaust passage, the catalyst capable of reducing $NO_X$ in the catalyst in the oxidizing atmosphere, and comprising a reducing agent adsorbent adsorbing a reducing agent in the inflowing exhaust gas therein when the pressure in the adsorbent becomes higher, and desorbing the adsorbed reducing agent therefrom when the pressure in the adsorbent becomes lower; a reducing agent feeding means for feeding a reducing agent to the catalyst; and pressure control means for controlling the pressure in the catalyst, wherein the pressure control means increases the pressure in the catalyst to adsorb the reducing agent in the catalyst, and reduces the pressure in the catalyst to desorb the adsorbed reducing agent from the catalyst, and wherein $NO_X$ is reduced by the reducing agent in the catalyst.

The present invention may be more fully understood from the description of the preferred embodiments of the invention as set forth below, together with the accompanying drawings.

DESCRIPTION OF THE PREFERRED EMBODIMENTS

Figure 1:
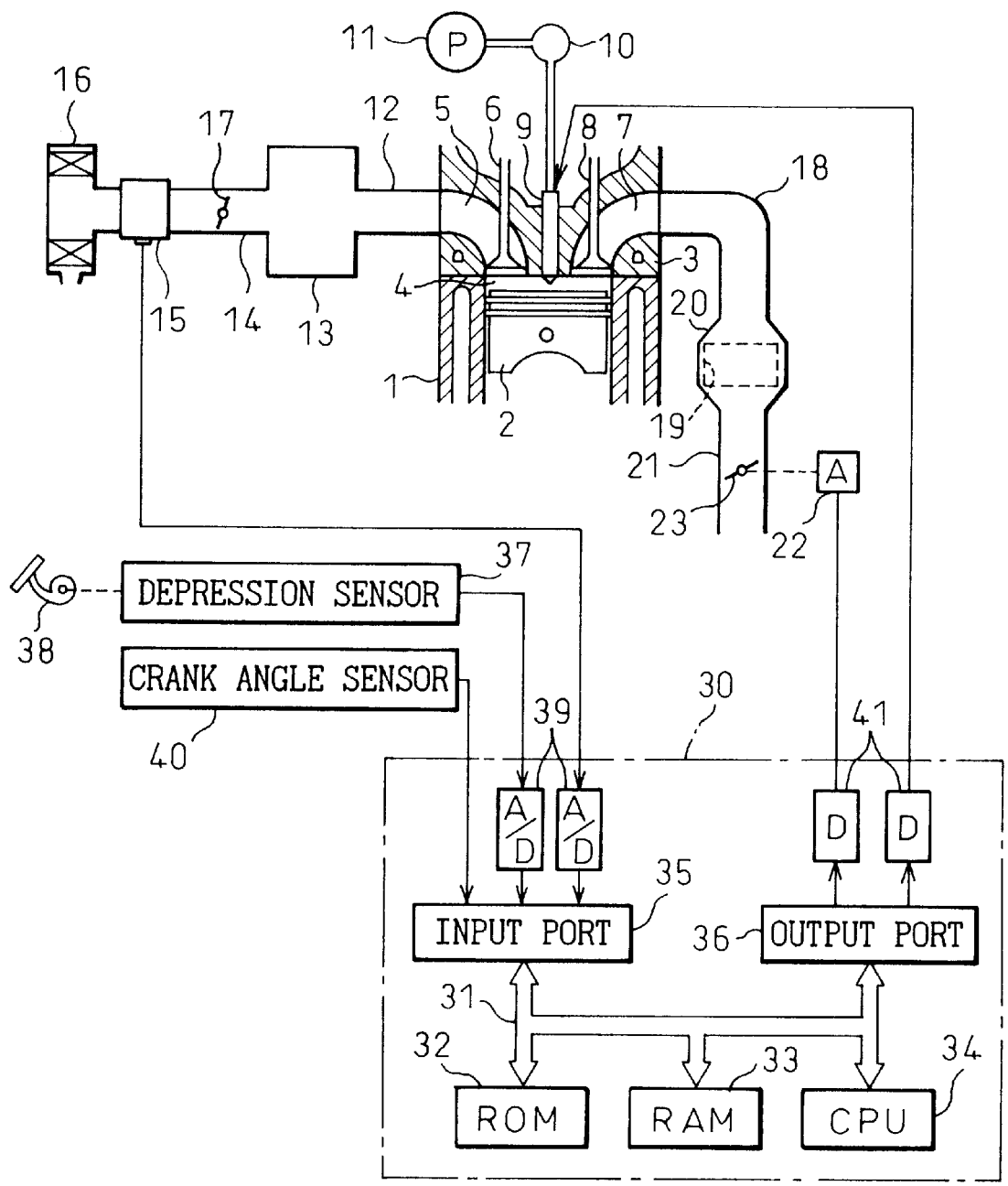
FIG. 1 is a general view of an engine.

FIG. 1 illustrates the present invention applied to a diesel engine. Alternatively, the present invention may be applied to a spark-ignition engine.

Referring to FIG. 1, a reference numeral 1 designates a cylinder block, 2 designates a piston, 3 designates a cylinder head, 4 designates a combustion chamber, 5 designates an intake port, 6 designates an intake valve, 7 designates an exhaust port, 8 designates an exhaust valve, and 9 designates a fuel injector, of an electromagnetic type, for injecting fuel directly into the combustion chamber 4. The fuel injectors 9 are connected to a fuel pump 11 via a common fuel accumulator 10. This allows the fuel injectors 9 to inject fuel at a plurality of times during one combustion cycle of the corresponding cylinders. The intake ports 5 of each cylinder are connected to a common surge tank 13 via corresponding branch 12, and the surge tank 13 is connected to an air-flow meter 15 and an air cleaner 16 via an intake duct 14. An intake air control valve 17 is disposed in the intake duct 14, and is driven by an actuator (not shown) of electromagnetic or negative pressure type. On the other hand, the exhaust ports 7 of each cylinder are connected to a common exhaust manifold 18. The manifold 18 is connected to a catalytic converter 20 housing an exhaust gas purifying catalyst 19 therein, and the converter 20 is connected to an exhaust pipe 21. An exhaust gas control valve 23 is disposed in the exhaust pipe 21, and is driven by an actuator 22 of electromagnetic or negative pressure type. The valve 23 may be used as an exhaust brake. Note that the fuel injectors 9 and the actuator 22 are controlled by output signals from an electronic control unit 30.

The electronic control unit (ECU) 30 is constructed as a digital computer and comprises a read-only memory (ROM)

32, a random-access memory (RAM) 33, a CPU (micro processor) 34, an input port 35, and an output port 36, which are interconnected with each other via a bidirectional bus 31. The air-flow meter 15 generates an output voltage in proportion to the amount of the intake air Ga, and an depression sensor 37 generates an output voltage in proportion to a depression DEP of an acceleration pedal 38. The output voltages of the sensors 15, 37 are input to the input port 35 via corresponding AD converters 39, respectively. The input port 35 is also connected to a crank angle sensor 40, which generates a pulse whenever a crankshaft is turned by, for example, 30 degrees. According to these pulses, the CPU 34 calculates the engine speed N. The output port 36 is connected to the fuel injectors 9 and the actuator 22 via corresponding drive circuits 41, respectively.

In the engine shown in FIG. 1, the exhaust gas purifying catalyst 19 is comprised of a precious metal, such as platinum Pt, palladium Pd, rhodium Rh, and iridium Ir, or a transition metal, such as copper Cu, iron Fe, cobalt Co, and nickel Ni, carried on a porous carrier, such as zeolite, alumina $Al_2O_3$, silica-alumina $SiO_2.Al_2O_3$, activated carbon, and titania $TiO_2$, by the ion changing process. For zeolite, silica rich zeolite, such as ZSM-5 zeolite, ferrierite, mordenite, etc, may be used. In the oxidizing atmosphere including the reducing agent, such as unburned hydrocarbon and carbon monoxide CO, the catalyst 19 can selectively react $NO_X$ in the catalyst 19 with the unburned hydrocarbon and CO, to thereby reduce the $NO_X$ to nitrogen $N_2$. Namely, the catalyst 19 can reduce $NO_X$ in the catalyst 19, even in the oxidizing atmosphere, if the inflowing exhaust gas includes the reducing agent.

In the diesel engine shown in FIG. 1, the air-fuel mixture is burned with an excess air to reduce the undesirable smoke and particulate discharged from the engine. Thus, the catalyst 19 is always kept in the oxidizing atmosphere. As a result, $NO_X$ is effectively reduced in the catalyst 19.

In this case, unburned hydrocarbon and CO discharged from the engine can act as a reducing agent. However, the amount of $NO_X$ to be purified is much larger than that of the unburned hydrocarbon and CO discharged from the engine, and the reducing agent will be too little to purify the $NO_X$ sufficiently. Thus, the reducing agent is secondarily fed to the catalyst 19, to thereby avoid a shortage of the reducing agent with respect to $NO_X$.

To feed the reducing agent to the catalyst 19 secondarily, there may be provided a reducing agent feeding device in the exhaust passage upstream of the catalyst 19 for feeding the reducing agent. Further, hydrocarbon such as gasoline, isooctane, hexane, heptane, gas oil, and kerosine, or hydrocarbon which can be stored in a liquid form, such as butane or propane, can be used as the reducing agent. However, in the present embodiment, fuel of the engine (hydrocarbon) is used as the reducing agent, and the reducing agent is fed to catalyst 19 by the fuel injector 9 injecting fuel at the combustion stroke or the exhaust stroke of the engine. The fuel injection at the combustion stroke or the exhaust stroke is different from a usual fuel injection to obtain the engine output, and does not contribute to the engine output. This omits an additional feeding device and an additional tank for the reducing agent. Note that the fuel injection at the combustion stroke or the exhaust stroke is referred to as a secondary fuel injection hereinafter.

As mentioned above, the catalyst 19 is comprised of a porous carrier, and thus may act as a hydrocarbon (reducing agent) adsorbent having a hydrocarbon (reducing agent) adsorption and desorption function. Namely, the catalyst 19 adsorbs hydrocarbon, of which molecule has a large dimension, in the inflowing exhaust gas therein, by physical adsorption, when the exhaust gas pressure in the catalyst 19 becomes higher, and desorbs the adsorbed hydrocarbon therefrom when the exhaust gas pressure in the catalyst 19 becomes lower, as mentioned in detail hereinafter. Therefore, $NO_X$ can be reduced in the catalyst 19 by both hydrocarbon in the inflowing exhaust gas and that desorbed from the catalyst 19. As mentioned at the beginning, however, the inventors of the present application have found that the $NO_X$ reduction by hydrocarbon desorbed from the catalyst 19 is more sufficient than that by hydrocarbon in the inflowing exhaust gas.

Figure 2:
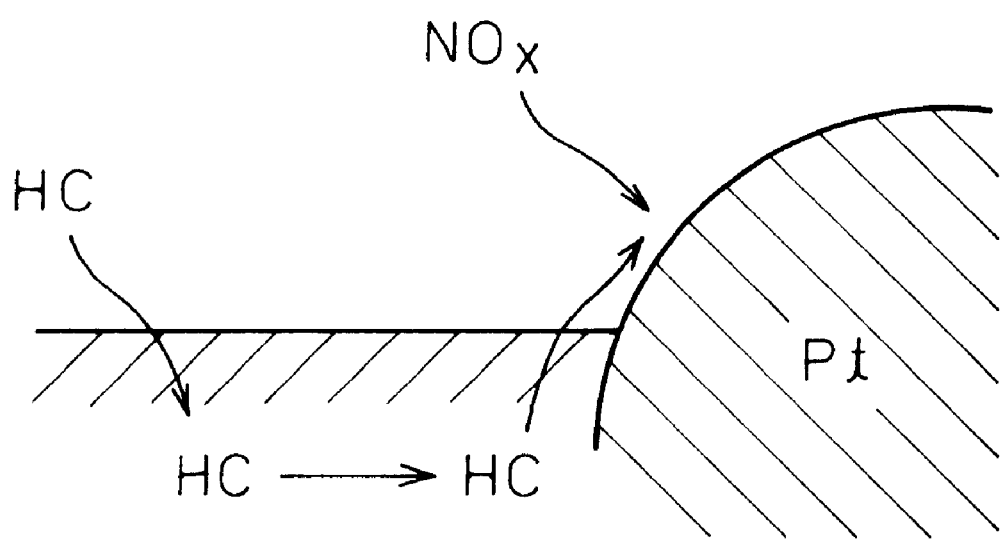
FIG. 2 is a schematic illustration for explaining the hydrocarbon adsorption and desorption and the $NO_X$ reduction in the exhaust catalyst.

The reason why hydrocarbon desorbed from the catalyst 19 provides a superior $NO_X$ reduction is still unclear. However, it can be considered that this is because the $NO_X$ reduction is performed according to the following mechanism. Namely, referring to FIG. 2, which illustrates a case where the catalyst 19 is comprised of platinum Pt carried on the porous carrier, first, hydrocarbon HC in the inflowing exhaust gas is adsorbed in the porous carrier. Then, the adsorbed hydrocarbon HC moves through the porous carrier, and is then desorbed from the carrier when, for example, the pressure in the catalyst 19 becomes lower. In this case, hydrocarbon HC is released from the carrier along the surface of the Pt particle, or is released from the carrier very adjacent to the Pt particle and then adheres on the surface of the Pt particle. Namely, a large amount of hydrocarbon HC will exist on the surface of the Pt particle, by, first, causing the catalyst 19 to adsorb hydrocarbon therein and then causing the catalyst 19 to desorb the adsorbed hydrocarbon therefrom. On the other hand, if $NO_X$ and hydrocarbon exist on the surface of the Pt particle adjacent to each other, the hydrocarbon reduces the $NO_X$. Accordingly, a large amount of hydrocarbon on the surface of the Pt particle reduces a large amount of $NO_X$ in the inflowing exhaust gas.

Contrarily, hydrocarbon flowing through the micro pores of the carrier without being adsorbed in the carrier does not necessarily reach the surface of the Pt particle. Thus, in this case, the amount of hydrocarbon on the surface of the Pt particle is not large, and therefore $NO_X$ is not necessarily reduced sufficiently.

Accordingly, causing the catalyst 19 to adsorb a large amount of hydrocarbon therein and causing it to desorb a large amount of hydrocarbon therefrom, provides good $NO_X$ purification.

It is known that an adsorbent adsorbing a substance by physical adsorption, as the catalyst 19, has an adsorbing capacity, which becomes larger when the adsorbent temperature becomes lower, and becomes smaller to thereby increase the amount of the substance desorbed from the adsorbent when the adsorbent temperature becomes higher. However, in the adsorbent with physical adsorption, the adsorbing capacity becomes larger when the pressure in the adsorbent become higher, and becomes smaller to thereby increase the amount of the substance desorbed from the adsorbent becomes larger when the pressure in the adsorbent become lower, regardless of the adsorbent temperature. Namely, for example, even when the catalyst temperature is reduced to cause the catalyst to adsorb hydrocarbon therein, the adsorbed hydrocarbon is desorbed from the catalyst if the pressure in the catalyst is sufficiently low. Also, even when the catalyst temperature increases to cause the catalyst to desorb hydrocarbon therefrom, hydrocarbon is adsorbed in the catalyst if the pressure in the catalyst is sufficiently high. Therefore, in the present invention, the pressure in the catalyst 19 is increased to cause the catalyst 19 to adsorb a large amount of hydrocarbon therein, and is reduced to cause the catalyst 19 to desorb a large amount of hydrocarbon therefrom. This is a basic concept of the exhaust gas purifying method according to the present invention.

The exhaust gas pressure is high when, for example, the engine load or the engine speed is high. Thus, it may be considered that a large amount of hydrocarbon is adsorbed in the catalyst 19 when the engine load or the engine speed is high. However, a pressure fluctuation obtained by the usual engine operation cannot cause the catalyst 19 to adsorb or desorb hydrocarbon sufficient to provide a good $NO_X$ purification. Therefore, in the present embodiment, the exhaust gas control valve 23 is arranged in the exhaust pipe 21 downstream of the catalyst 19, to control the pressure in the catalyst 19. Namely, the opening of the valve 23 is made smaller when the hydrocarbon adsorption of the catalyst 19 is to be performed, and is kept fully open in other conditions. This makes the increased pressure higher than the maximum pressure obtained in the conventional engine, i.e., an engine without the valve 23.

When the pressure in the catalyst 19 is increased to perform the hydrocarbon adsorption of the catalyst 19, the hydrocarbon desorption of the catalyst 19 cannot be performed. Thus, if a large amount of $NO_X$ flows in the catalyst 19 during the hydrocarbon adsorption of the catalyst 19, the $NO_X$ may be reduced insufficiently. On the other hand, an amount of $NO_X$ discharged from the engine is kept small when the engine load or the engine speed is low. Therefore, in the present embodiment, the hydrocarbon adsorption is performed when both the engine load and the engine speed are low.

In other words, a pressure increases by the valve 23 is prevented when the engine load or the engine speed is high. This prevents the back pressure of the engine from being higher when the engine load or the engine speed is high, to thereby ensure a large engine output.

Further, in the present embodiment, the secondary fuel injection is performed only when the pressure in the catalyst 19 is increased by the valve 23. Namely, as can be understood from the above description, it is preferable to cause the catalyst 19 to temporarily store hydrocarbon therein in as large amount as possible, for the effective use of the fuel fed by the secondary fuel injection to reduce $NO_X$. On the other hand, it is impossible to cause the catalyst 19 to adsorb a large amount of hydrocarbon when the valve 23 is fully open. Therefore, in the present embodiment, the secondary fuel injection is stopped when the valve 23 is made fully open, and starts when the opening of the valve 23 is made smaller.

The temperature of the exhaust gas or the catalyst becomes high when the engine load or the engine speed becomes high, and thus, if the secondary fuel injection is performed at this time, the hydrocarbon may burn completely before reaching the catalyst 19, or burn quickly when it reaches the catalyst 19. In the present embodiment, as mentioned above, the pressure increase in the catalyst 19 is prevented when the engine load or the engine speed is high, and thus the secondary fuel injection is prevented when the engine load or the engine speed is high. Therefore, fuel fed by the secondary fuel injection is used more effectively to reduce $NO_X$. Further, the secondary fuel injection is performed when both the engine load and the engine speed are low where the catalyst temperature is low. As a result, a large amount of hydrocarbon by the secondary fuel injection will be adsorbed in the catalyst 19.

Next, the exhaust gas purifying method according to the present embodiment will be explained, in detail, with reference to routines shown in FIGS. 4 and 5, as well as a timechart shown in FIG. 3. The routines shown in FIGS. 4 and 5 are executed by interruption every predetermined crank angle, respectively.

Figure 4:
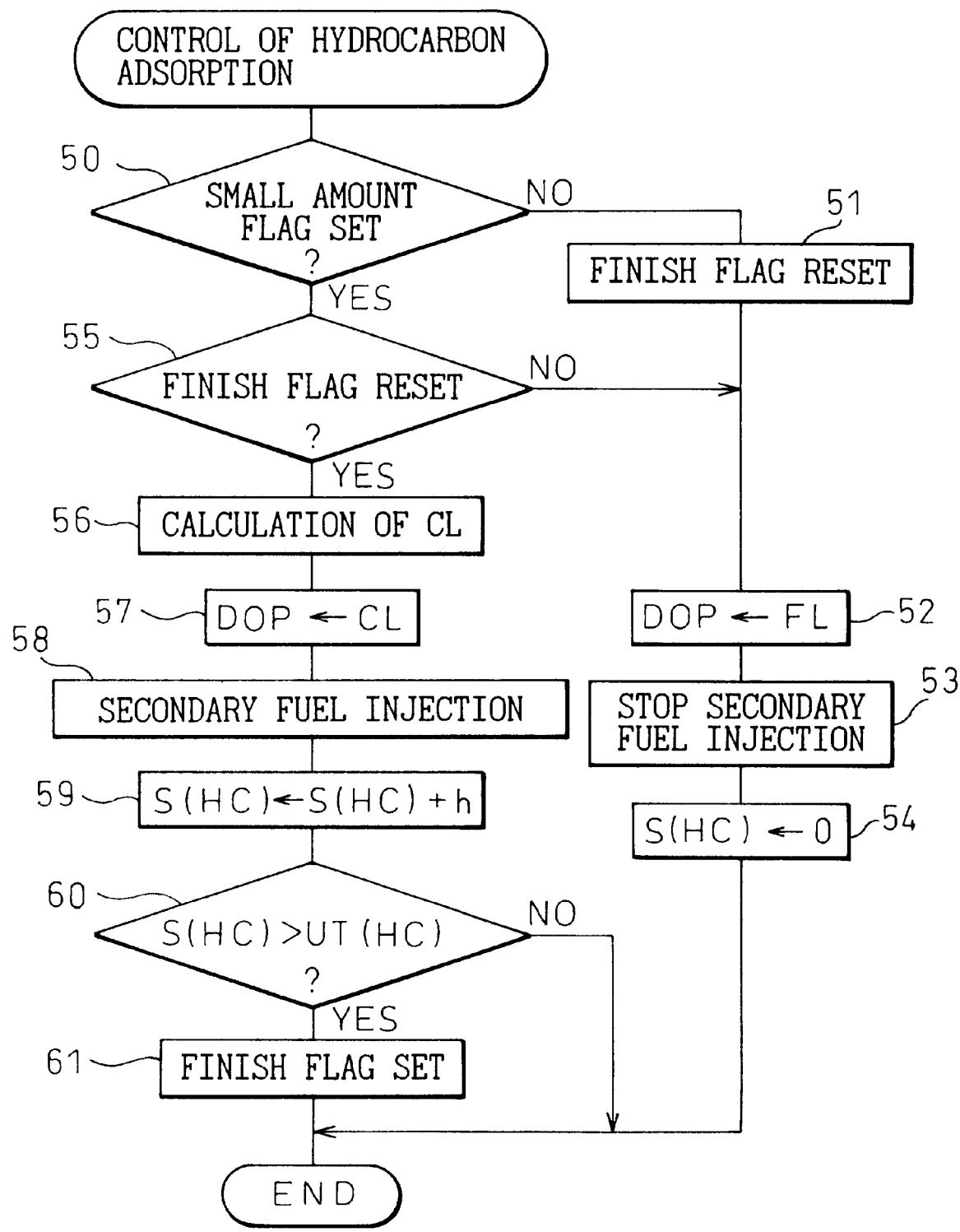
FIG. 4 shows a flowchart for controlling the hydrocarbon adsorption.

First, referring to FIG. 4 showing a routine for controlling the hydrocarbon adsorption, first, in step 50, it is judged whether a small amount flag is set. The small amount flag is set or reset in the routine shown in FIG. 5.

Figure 5:
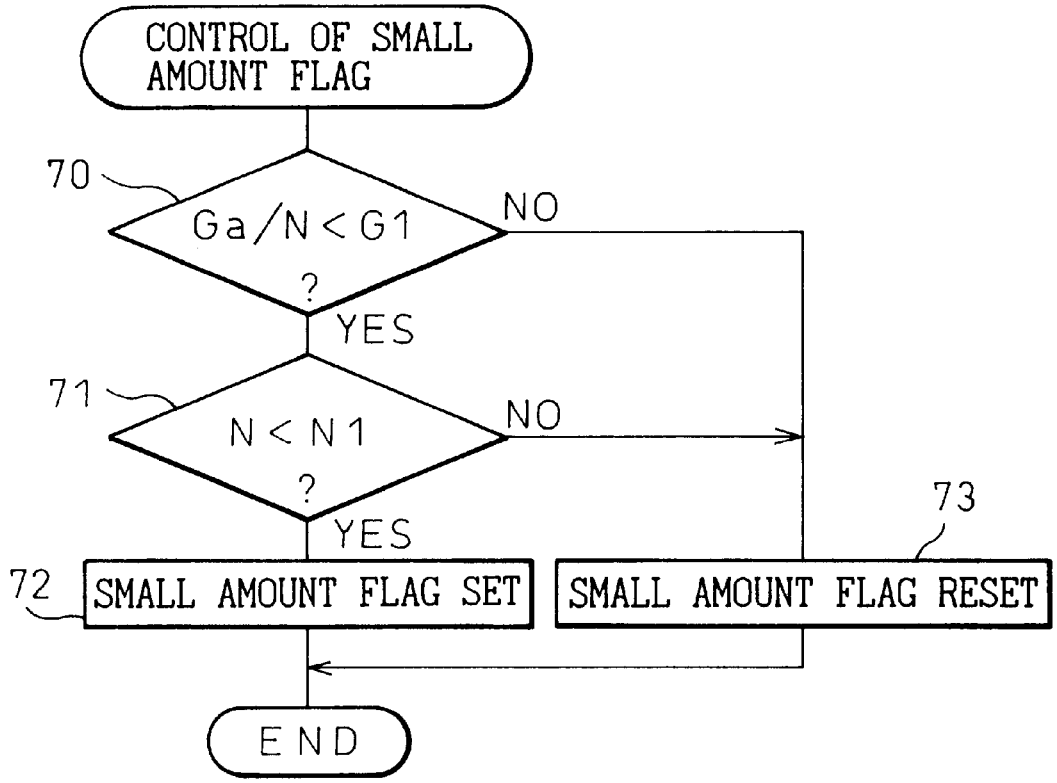
FIG. 5 shows a flowchart for controlling a small amount flag.

Referring to FIG. 5, first, in step 70, it is judged whether the engine load Ga/N (the intake air amount Ga/the engine speed N) is lower than a predetermined load G1. When Ga/N<G1, the routine goes to step 71, where it is judged whether the engine speed N is lower than a predetermined speed N1. When N<N1, the routine goes to step 72, where the small amount flag is set. Namely, the small amount flag is set when both the engine load and the engine speed are low and thus the amount of $NO_X$ discharged from the engine is small. Contrarily, when Ga/N≧G1 in step 70 or when N≧N1 in step 71, the routine goes to step 73, where the small amount flag is reset. Namely, the small amount flag is reset when the engine load or the engine speed is high and thus the amount of $NO_X$ discharged from the engine is large.

Figure 3:
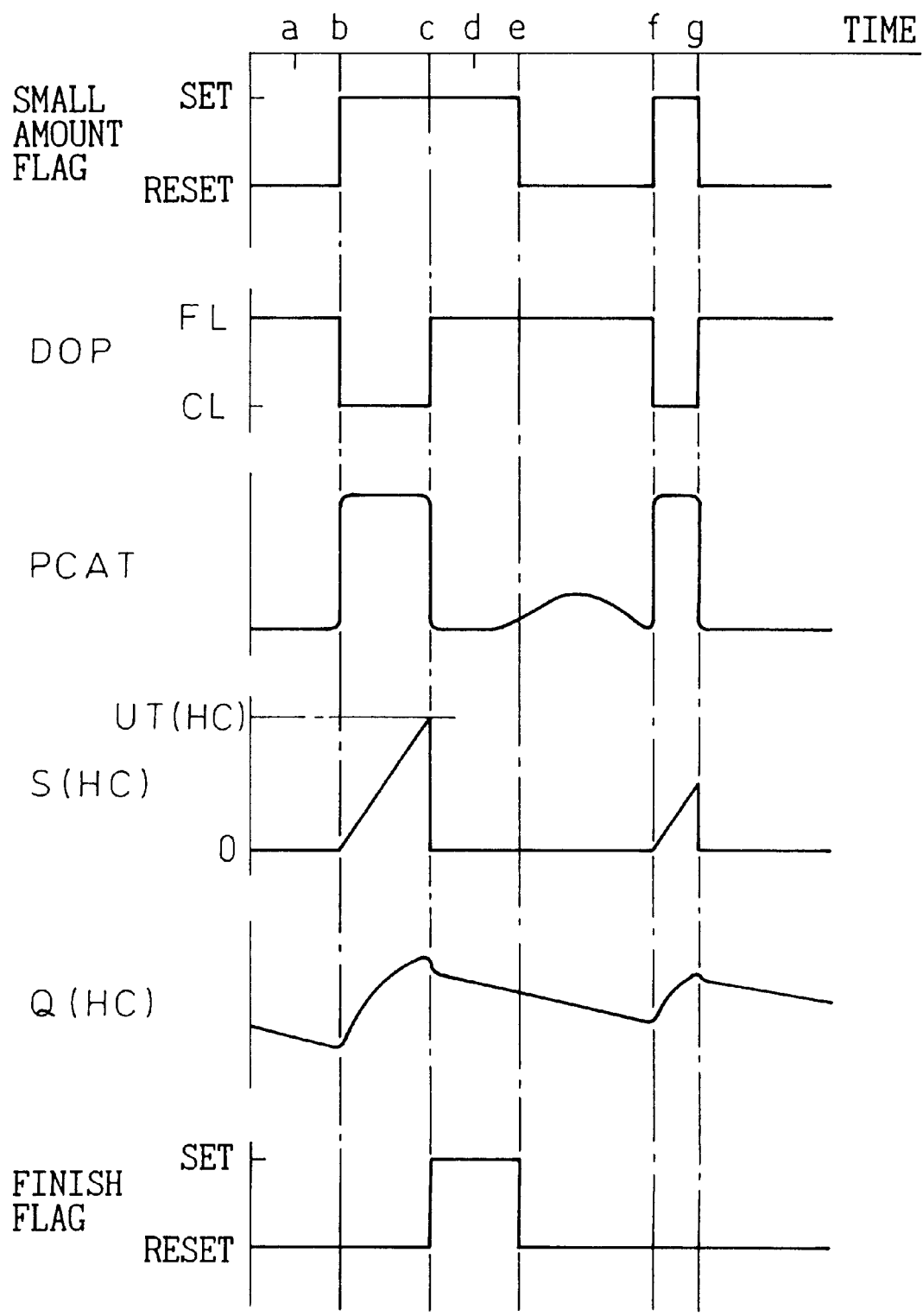
FIG. 3 shows a timechart illustrating the exhaust gas purifying method according to the embodiment shown in FIG. 1.

When the small amount flag is reset as in the time a in FIG. 3, the routine goes from step 50 to step 51, where a finish flag is reset. The finish flag is set when the small amount flag is set after the hydrocarbon adsorption is finished, and is reset at the other condition. In the following step 52, the opening DOP of the exhaust gas control valve 23 is made equal to FL, which represents the full open. In the following step 53, the secondary fuel injection is stopped. In the following step 54, a cumulative amount of hydrocarbon by the secondary fuel injection S(HC) is made clear.

Figure 6:
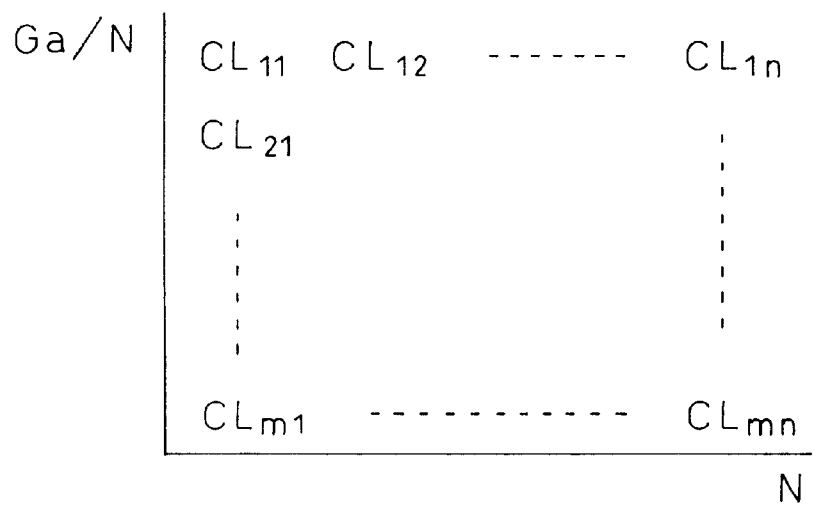
FIG. 6 is a diagram illustrating an opening of an exhaust gas control valve.

When the small amount flag is set as in the time b in FIG. 3, the routine goes from step 50 to step 55, where it is judged whether the finish flag is reset. When the finish flag is reset as in time b in FIG. 3, the routine goes to step 56, where a small valve opening CL for the valve 23 is calculated. The valve opening CL is suitable for increasing the pressure in the catalyst 19 sufficiently, while maintaining a decrease in the engine output within a tolerable range, which decrease in the engine output may occur when the back pressure of the engine increases due to the small opening of the valve 23. The valve opening CL is obtained, by experiment in advance, and is stored in the ROM 32 in advance, in the form of a map as shown in FIG. 6, as a function of the engine operating condition such as the engine load Ga/N and the engine speed N. In the following step 57, the opening of the valve 23 is made equal to CL. As a result, the pressure PCAT in the catalyst 19 increases, as shown in FIG. 3.

In the following step 58, the secondary fuel injection is performed. Namely, the secondary fuel is fed by, for example, a constant amount h, at the compression stroke or the exhaust stroke of the engine. In the following step 59, the cumulative hydrocarbon amount S(HC) is calculated. In this condition, the amount of hydrocarbon Q(HC) adsorbed in the catalyst 19 increases, and the cumulative hydrocarbon amount S(HC) also increases, as shown in FIG. 3. In the following step 60, it is judged whether the cumulative hydrocarbon amount S(HC) is larger than a predetermined upper threshold UT(HC). When S(HC)≦UT(HC), it is judged that the adsorbed hydrocarbon amount Q(HC) is still small, and thus the secondary fuel injection is continued while the valve opening DOP is kept CL. Contrarily, when S(HC)>UT(HC) as in the time c in FIG. 3, it is judged that the adsorbed hydrocarbon amount Q(HC) is large enough, and thus the routine goes to step 61, where the finish flag is set. Then, the processing cycle is ended.

In the following processing cycle, the routine goes from step 55 to steps 52, 53, and 54, in turn. Namely, the valve opening DOP is made equal to FL, the secondary fuel injection is stopped, and the cumulative hydrocarbon amount S(HC) is made clear, as in the time c in FIG. 3.

When the valve 23 is made fully open, hydrocarbon adsorbed in the catalyst 19 is gradually desorbed from the catalyst 19 in accordance with the engine operating condition such as the pressure in the catalyst 19 and the temperature of the catalyst 19, etc., and the adsorbed hydrocarbon amount S(HC) decreases gradually, as in the time d in FIG. 3. The desorbed hydrocarbon will reduce $NO_X$ in the catalyst 19.

Then, when the small amount flag is reset as in the time e in FIG. 3, the routine goes from step 50 to step 51, where the finish flag is reset.

Then, when the small amount flag is set again as in the time f in FIG. 3, the valve opening DOP is reduced to CL, and the secondary fuel injection is resumed, because the finish flag is reset at this time. Then, when the small amount flag is reset as in the time g in FIG. 3, the valve opening DOP is made equal to FL, the secondary fuel injection is stopped, and the cumulative hydrocarbon amount S(HC) is cleared, even though the cumulative hydrocarbon amount S(HC) is lower than the upper threshold UT(HC). Namely, the reducing the pressure in the catalyst 19 and the secondary fuel injection are prevented when the engine load or the engine speed is high. In this way, the hydrocarbon adsorption and desorption of the catalyst 19 is performed alternately and repeatedly.

Figure 7:
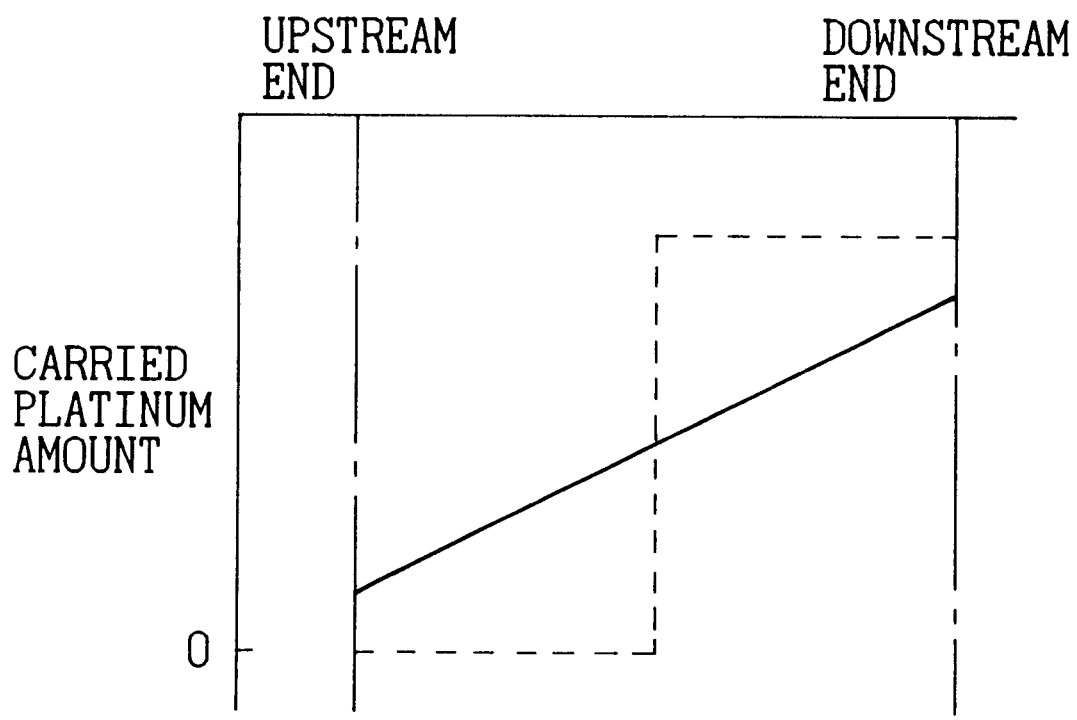
FIG. 7 is a diagram illustrating the carried platinum amount.

As mentioned above with reference to FIG. 2, hydrocarbon adsorbed in the porous carrier of the catalyst 19 moves through the carrier in an exhaust gas flow direction, and is then desorbed from the carrier. In this case, it can be considered that almost all of the hydrocarbon adsorbed in the carrier is adsorbed at the upstream side of the carrier, and almost all of the hydrocarbon desorbed from the carrier is desorbed from the downstream side of the carrier. On the other hand, $NO_X$ is sufficiently purified if platinum Pt exists around the hydrocarbon desorbed from the carrier. Thus, in the present embodiment, the amount of the platinum carried on the carrier at a position near the downstream end of the catalyst 19 is larger than that at a position far from the downstream end. Namely, the amount of platinum Pt carried on the carrier becomes larger along a direction from the upstream end of the catalyst 19 toward the downstream end, as shown in FIG. 7 by the solid line. Alternatively, as shown in FIG. 7 by the broken line, almost no platinum may be carried on the upstream half of the catalyst 19, and platinum may be carried on the downstream half of the catalyst 19. Note that the above explanation is also applied to a case where the catalyst 19 is comprised of precious metal or transition metal other than platinum Pt, and an explanation thereof is omitted.

Figure 8:
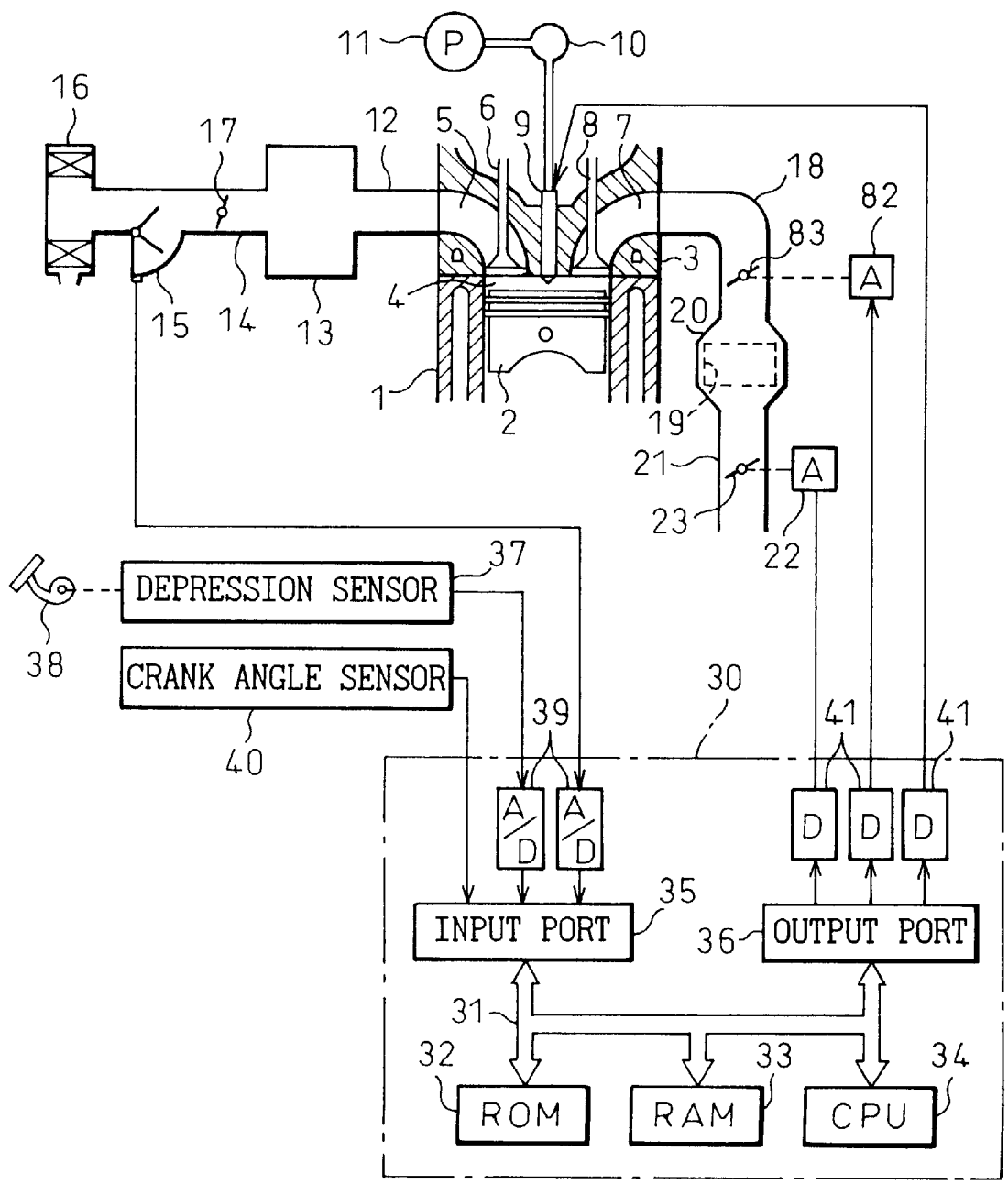
FIG. 8 is a general view of an engine according to another embodiment of the present invention.

FIG. 8 illustrates another embodiment.

Referring to FIG. 8, there is provided an additional exhaust gas control valve 83 in the exhaust manifold 18. Namely, the upstream exhaust gas control valve 83 is disposed upstream of the catalyst 19, and the downstream exhaust gas control valve 23 is disposed downstream of the catalyst 19. The upstream valve 83 is driven by an actuator 82 of, for example, an electromagnetic or negative pressure type. The output port 36 of the ECU 30 is connected to the actuator 82 via a corresponding drive circuit 41, and the actuator 82 is controlled by output signals from the ECU 30.

During the usual engine operation, both the upstream valve 83 and the downstream valve 23 are kept fully open, respectively. On the other hand, when the pressure in the catalyst 19 is to be increased, the opening of the downstream valve 23 is made small, while the upstream valve 83 is kept fully open. When the pressure in the catalyst 19 is to be reduced, the opening of the upstream valve 83 is made small, while the downstream valve 23 is kept fully open. This makes the increased pressure higher than the maximum pressure obtained in the conventional engine, i.e., an engine without the valves 23 and 83, and makes the reduced pressure lower than the minimum pressure obtained in the conventional engine.

In the engine shown in FIG. 8, the catalyst 19 is comprised of at least one substance selected from alkali metals such as potassium K, sodium Na, lithium Li, and cesium Cs, alkali earth metals such as barium Ba and calcium Ca, rare earth metals such as lanthanum La and yttrium Y, and transition metals such as iron Fe, copper Cu, cobalt Co, and nickel Ni, and of precious metals such as palladium Pd, platinum Pt, rhodium Rh, and iridium Ir, which are carried on a porous carrier, such as zeolite (for example, silica rich zeolite such as ZSM-5 zeolite, ferrierite, mordenite), alumina $Al_2O_3$, silica-alumina $SiO_2.Al_2O_3$, activated carbon, and titania $TiO_2$. The catalyst 19 formed in this manner simultaneously constitutes the hydrocarbon adsorbent as mentioned above and a $NO_X$ absorbent, which absorbs $NO_X$ therein when the oxygen concentration in the inflowing exhaust gas is high, and releases the absorbed $NO_X$ therefrom when the oxygen concentration in the inflowing exhaust gas becomes lower.

When the above-mentioned catalyst 19 is disposed in the exhaust passage of the engine, the catalyst 19 actually performs the $NO_X$ absorbing and releasing function, but the detailed mechanism of the function is still unclear. However, it can be considered that the function is performed according to the following mechanism. This mechanism will be explained by using as an example a case where platinum Pt and barium Ba are carried on the carrier, but a similar mechanism is obtained even if another precious metal, alkali metal, alkali earth metal, or rare earth metal is used.

Namely, when the oxygen concentration in the inflowing exhaust gas increases, the oxygen $O_2$ is deposited on the surface of platinum Pt in the form of $O_2^-$ or $O^{2-}$. On the other hand, NO in the inflowing exhaust gas reacts with $O_2^-$ or $O^{2-}$ on the surface of the platinum Pt and becomes $NO_2$ ($2NO+O_2 \rightarrow 2NO_2$). Subsequently, a part of the produced $NO_2$ is oxidized on the platinum Pt and is absorbed into the catalyst. While bonding with barium oxide BaO, it is diffused in the catalyst in the form of nitric acid ions $NO_3^-$. In this way, $NO_X$ is stored in the catalyst 19.

Contrarily, when the oxygen concentration in the inflowing exhaust gas becomes lower and the production of $NO_2$ is lowered, the reaction proceeds in an inverse direction ($NO_3^- \rightarrow NO_2$), and thus nitric acid ions $NO_3^-$ in the catalyst 19 are released in the form of $NO_2$ from the catalyst 19. Namely, when the oxygen concentration in the inflowing exhaust gas is lowered, $NO_X$ is released from the catalyst 19.

Also, in the diesel engine shown in FIG. 8, the air-fuel mixture is burned with an excess air, and thus the catalyst 19 is kept in the oxidizing atmosphere as long as the secondary fuel injection is stopped. Therefore, $NO_X$ flowing in the catalyst 19 is absorbed in the catalyst 19, to thereby reduce the $NO_X$ amount discharged from the catalyst 19 to the pipe 21 considerably.

$NO_X$ is absorbed in the catalyst 19 as long as the catalyst 19 is not saturated with $NO_X$. Namely, the $NO_X$ amount discharged from the catalyst 19 is considerably reduced as long as the catalyst 19 is not saturated with $NO_x$. Therefore, it is necessary to release the absorbed $NO_x$ from the catalyst 19 before the catalyst 19 is saturated with $NO_x$.

The present inventors have found that, when the pressure in the catalyst 19 is reduced to desorb the adsorbed hydrocarbon from the catalyst 19, the absorbed $NO_x$ is also released from the catalyst 19, and that, at this time, the $NO_x$ amount discharged from the catalyst 19 to the pipe 21 does not increase considerably. The $NO_x$ release and purification function in this case is still unclear. However, it can be considered that the $NO_x$ release and purification is performed according to the following mechanism. Namely, when the pressure in the catalyst 19 is reduced, hydrocarbon adsorbed in the catalyst 19 is desorbed therefrom almost all at once. As a result, the surface of the catalyst 19 is in a reducing atmosphere, and thus the absorbed $NO_x$ is released from the catalyst 19. The released $NO_x$ is immediately reduced by hydrocarbon desorbed from the catalyst 19.

When the pressure in the catalyst 19 is reduced, the adsorbed hydrocarbon is actually desorbed from the catalyst 19 and the absorbed $NO_x$ is actually released from the catalyst 19, and the hydrocarbon amount and the $NO_x$ amount discharged from the catalyst 19 is kept small, at this time. Thus, in the present embodiment, an amount of $NO_x$ absorbed in the catalyst 19 is obtained, and the pressure in the catalyst 19 is reduced when the obtained absorbed $NO_x$ amount is larger than a predetermined upper threshold $UT(NO_x)$, to thereby release $NO_x$ from the catalyst 19. This ensures the $NO_x$ absorbing capacity of the catalyst 19 and the hydrocarbon adsorbing capacity of the catalyst 19. Note that, to release the absorbed $NO_x$ from the catalyst 19 by reducing the pressure in the catalyst 19, it is necessary for the catalyst 19 to adsorb hydrocarbon in advance.

Figure 9:
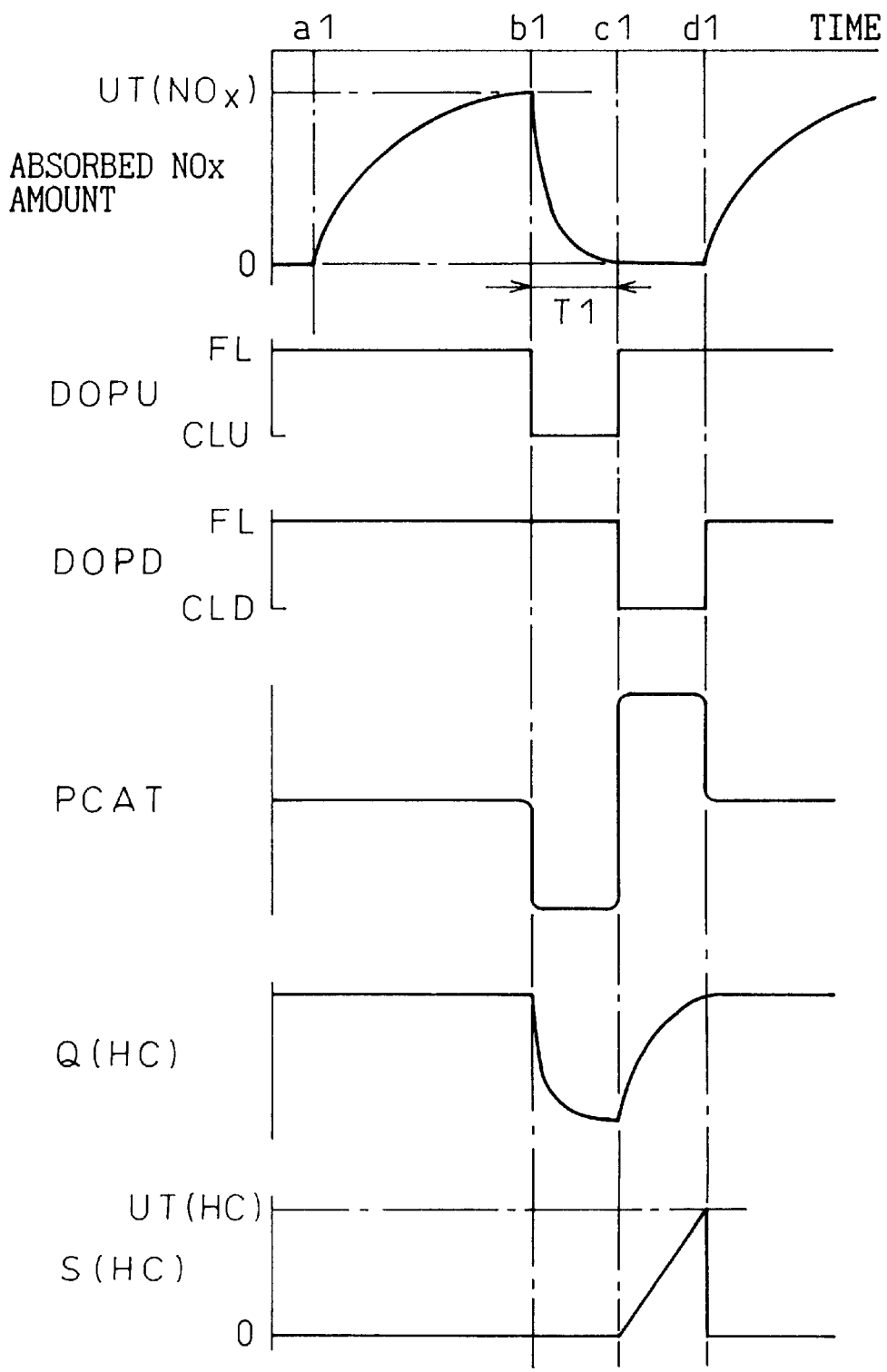
FIG. 9 shows a timechart illustrating the exhaust gas purifying method according to the embodiment shown in FIG. 8.

Next, the exhaust gas purifying method according to the present embodiment will be explained with reference to a timechart shown in FIG. 9. In FIG. 9, the time a1 represents a time at which the $NO_x$ absorption of the catalyst 19 starts. At this time, the opening DOPU of the upstream valve 83 is made equal to the full open FL, and the opening DOPD of the downstream valve 23 is also made equal to the full open FL. Further, at this time, the secondary fuel injection is stopped, and a certain amount of hydrocarbon is adsorbed in the catalyst 19.

When the $NO_x$ absorption of the catalyst 19 starts, the absorbed $NO_x$ amount increases. Then, when the absorbed $NO_x$ amount becomes larger than the upper threshold $UT(NO_x)$ as in the time b1, the $NO_x$ release and the hydrocarbon desorption start. Namely, the opening DOPU of the upstream valve 83 is made equal to a small opening CLU, while the downstream valve 23 is kept fully open. As a result, the pressure PCAT in the catalyst 19 is reduced, as shown in FIG. 9.

Figure 10:
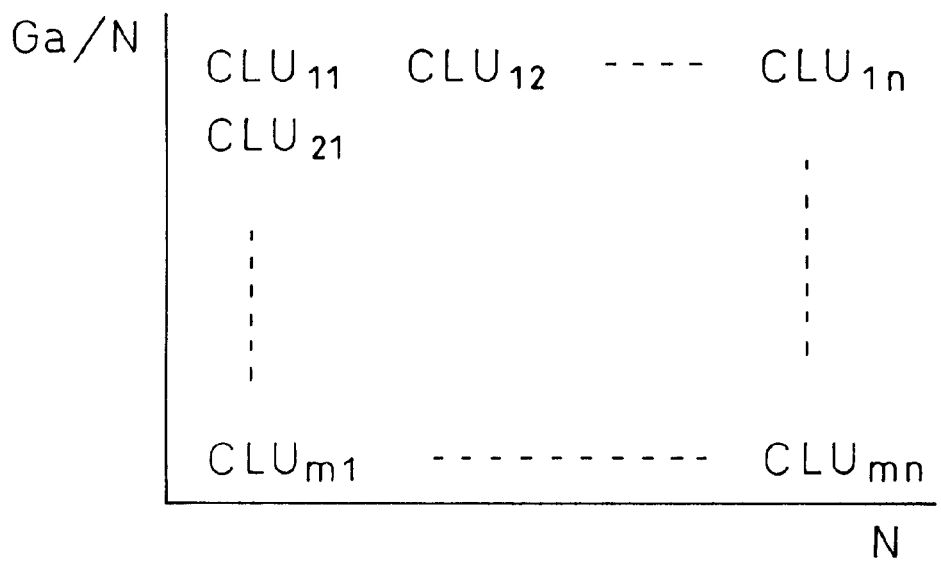
FIG. 10 is a diagram illustrating an opening of an upstream exhaust gas control valve.

The valve opening CLU is an opening suitable for reducing the pressure in the catalyst 19 sufficiently, while maintaining the decrease of the engine output within a tolerable range, which decrease of the engine output may occur when the back pressure of the engine increases due to the small opening of the upstream valve 83. The opening CLU is obtained by experiment, in advance, and is stored in the ROM 32 in advance, in the form of a map as shown in FIG. 10, as a function of the engine operating condition such as the engine load Ga/N and the engine speed N.

Figure 11:
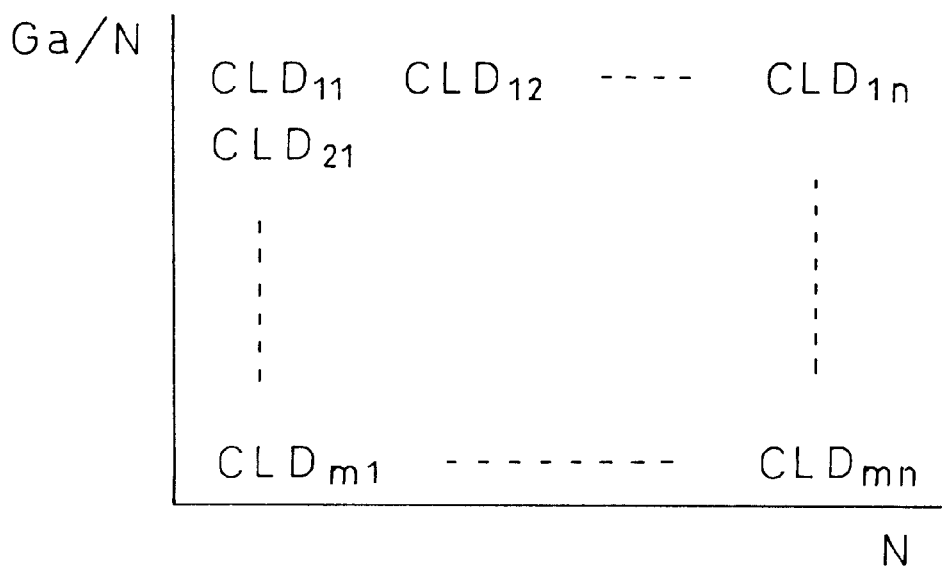
FIG. 11 is a diagram illustrating an opening of a downstream exhaust gas control valve.

When the pressure PCAT drops in this way, the adsorbed hydrocarbon is desorbed from the catalyst 19 and thus the adsorbed hydrocarbon amount Q(HC) decreases, and the absorbed $NO_x$ is released from the catalyst 19 and thus the absorbed $NO_x$ amount also decreases. Then, when the time T1 has passed since the reducing of the pressure in the catalyst 19 starts, as in the time c1, the hydrocarbon desorption and the $NO_x$ release of the catalyst 19 are stopped and the hydrocarbon adsorption of the catalyst 19 is started. Namely, when the absorbed $NO_x$ amount becomes almost zero, the opening DOPU of the upstream valve 83 is made equal to the full open FL and the opening DOPD of the downstream valve 23 is made equal to a small opening CLD, to thereby increase the pressure at the catalyst 19. The valve opening CLD is an opening suitable for increasing the pressure in the catalyst 19 sufficiently, while maintaining the decrease of the engine output within a tolerable range, which decrease of the engine output will occur when the back pressure of the engine increases by the small opening of the downstream valve 23. The opening CLD is obtained, by experiment in advance, and is stored in the ROM 32 in advance, in the form of a map as shown in FIG. 11, as a function of the engine operating condition such as the engine load Ga/N and the engine speed N.

Further, at the time c1, the secondary fuel injection is started, and hydrocarbon from the secondary fuel injection is adsorbed in the catalyst 19. Thus, the adsorbed hydrocarbon amount Q(HC) increases gradually, and the cumulative hydrocarbon amount from the secondary fuel injection S(HC) also increases gradually. Then, at the time d1, the cumulative hydrocarbon amount S(HC) becomes larger than the upper threshold UT(HC), and the hydrocarbon adsorption of the catalyst 19 is stopped. Namely, the opening DOPD of the downstream valve 23 is made equal to the full open FL while the upstream valve 83 is kept fully open, and the secondary fuel injection is stopped. Note that, during the hydrocarbon adsorption and the hydrocarbon desorption of the catalyst 19, the catalyst 19 is kept in the reducing atmosphere, and thus the $NO_x$ absorption of the catalyst 19 is prevented. $NO_x$ flowing to the catalyst 19 at this time is reduced by the hydrocarbon desorbed from the catalyst 19 or the hydrocarbon in the exhaust gas flowing to the catalyst 19.

Figure 12:
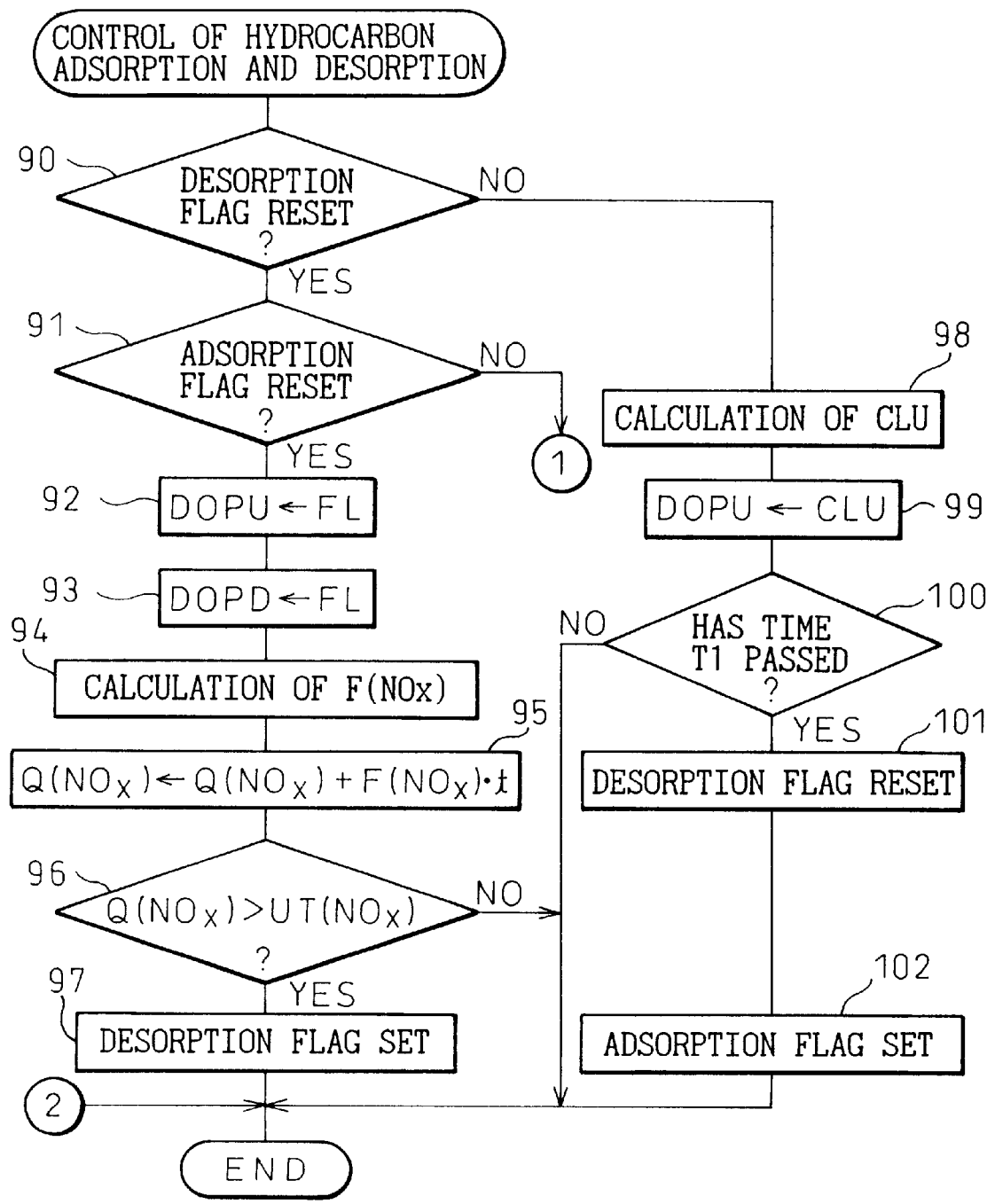
FIGS. 12 and 13 show a flowchart for controlling the hydrocarbon adsorption and desorption according to the embodiment of FIG. 8.
Figure 13:
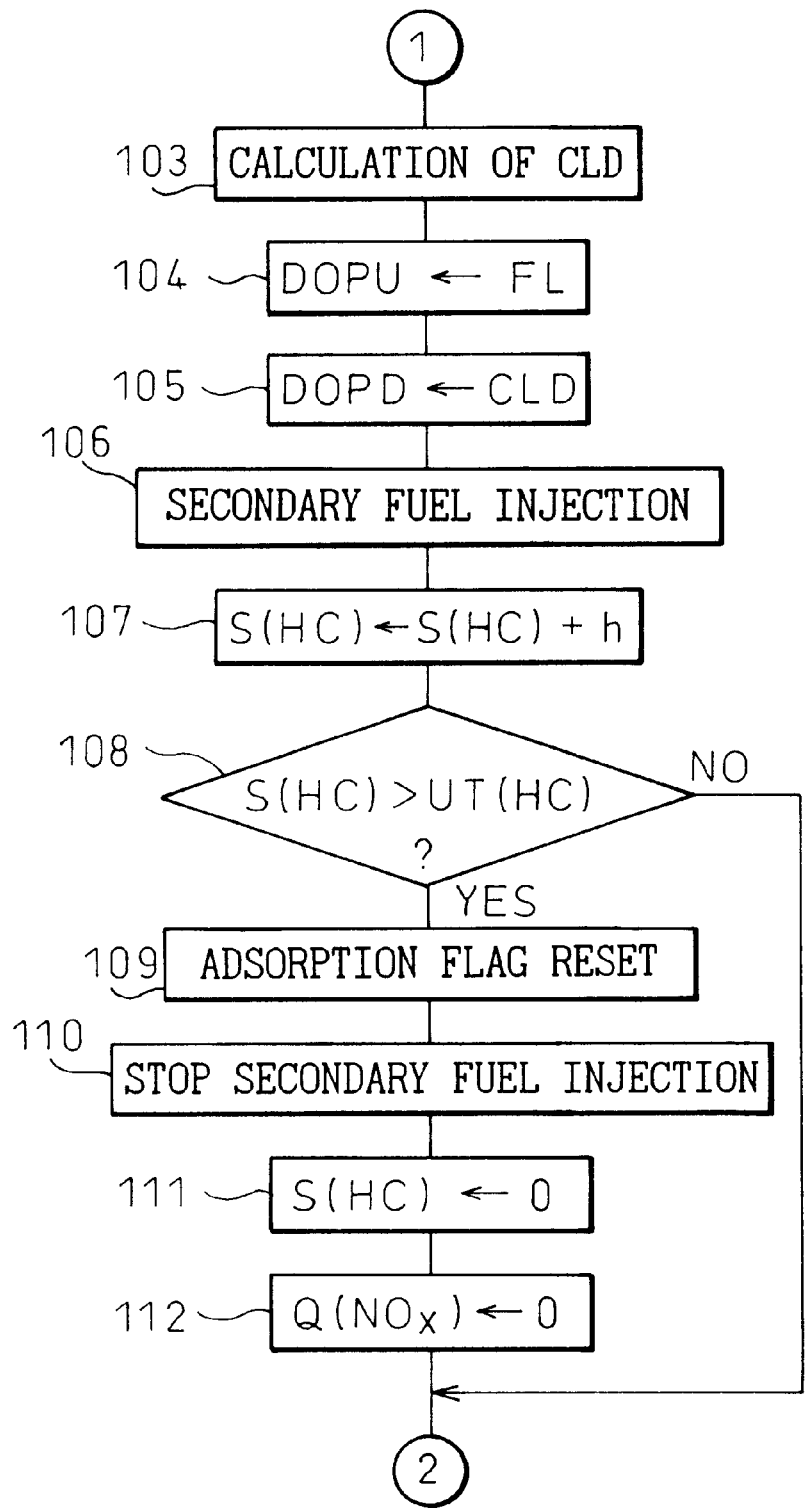

FIGS. 12 and 13 show a routine for controlling the hydrocarbon adsorption and desorption of the catalyst 19, according to the present embodiment. The routine shown in FIGS. 12 and 13 is executed by interruption every predetermined crank angle.

Referring to FIGS. 12 and 13, first, in step 90, it is judged whether a desorption flag is reset. The desorption flag is set when the adsorbed hydrocarbon is to be desorbed from the catalyst 19, and is reset when the hydrocarbon is not to be desorbed. When the desorption flag is reset, the routine goes to step 91, where it is judged whether an adsorption flag is reset. The adsorption flag is set when hydrocarbon is to be adsorbed in the catalyst 19, and is reset when hydrocarbon is not to be adsorbed. When the adsorption flag is reset, i.e., when both the desorption flag and the adsorption flag are reset, the routine goes to step 92, where the opening DOPU of the upstream valve 83 is made equal to the full open FL, and in the following step 93, the opening DOPD of the downstream valve 23 is made equal to the full open FL. The following steps 94 and 95 are for calculating the absorbed $NO_x$ amount $Q(NO_x)$.

It is difficult to obtain the absorbed $NO_x$ amount $Q(NO_x)$ directly. Thus, in the present embodiment, the absorbed $NO_x$ amount $Q(NO_x)$ is estimated on the basis of an amount of $NO_x$ flowing to the catalyst 19, i.e., an amount of $NO_x$ discharged from the engine. Namely, an amount of the exhaust gas discharged from the engine per unit time increases as the engine speed N increases, and thus the amount of $NO_X$ flowing to the catalyst 19 per unit time increases as the engine speed N increases. Also, an amount of the exhaust gas discharged from the engine per unit time increases and the combustion temperature increases as the engine load, i.e., the depression DEP of the acceleration pedal 38 increases, and thus the amount of $NO_X$ flowing to the catalyst 19 per unit time increases as the depression DEP increases.

Figure 14A:
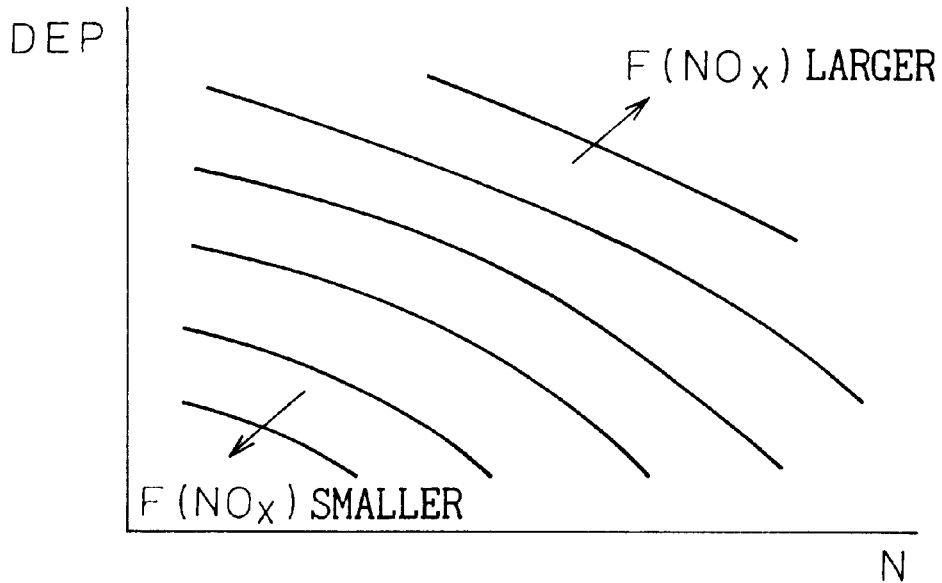
FIGS. 14A and 14B are diagrams illustrating the $NO_X$ amount discharged from the engine per unit time.
Figure 14B:
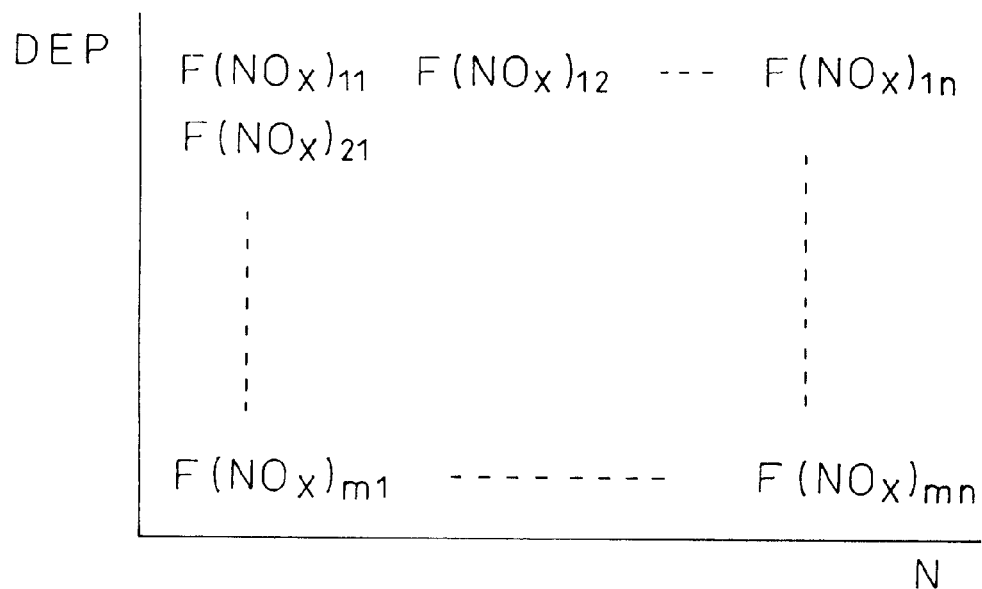

FIG. 14A illustrates the relationships, obtained by experiment, between the amount of $NO_X$ discharged from the engine per unit time $F(NO_X)$, and the depression DEP and the engine speed N. In FIG. 14A, each curve shows the identical amount of $NO_X$. As shown in FIG. 14A, the discharged $NO_X$ amount $F(NO_X)$ increases as the depression DEP increases, and increases as the engine speed N increases. The discharged $NO_X$ amount $F(NO_X)$ shown in FIG. 14A is stored in the ROM 32 in advance, in the form of the map as shown in FIG. 14B.

In other words, when both the hydrocarbon adsorption and the hydrocarbon desorption are not in process, i.e., when the $NO_X$ absorption is in process, the absorbed $NO_X$ amount $Q(NO_X)$ increases by $F(NO_X)$ per unit time. Thus, if a time interval of the finding of the discharged $NO_X$ amount $F(NO_X)$ is represented by t, the absorbed $NO_X$ amount $Q(NO_X)$ increases by $F(NO_X) \cdot t$, during a period from the last processing cycle to the present processing cycle.

Thus, in step 94, the discharged $NO_X$ amount $F(NO_X)$ is calculated using the map shown in FIG. 14B, and in the following step 95, the absorbed $NO_X$ amount $Q(NO_X)$ is calculated using the following equation.

$$Q(NO_X)=Q(NO_X)+F(NO_X) \cdot t$$

The time interval for the finding of $F(NO_X)$ is detected by a timer provided in the ECU 30.

In the following step 96, it is judged whether the absorbed $NO_X$ amount $Q(NO_X)$ is larger than the upper threshold $UT(NO_X)$. When $Q(NO_X) \leq UT(NO_X)$, it is judged that the $NO_X$ absorbing capacity of the catalyst 19 is still large, and the processing cycle is ended. Contrarily, when $Q(NO_X) > UT(NO_X)$, it is judged that the $NO_X$ absorbing capacity of the catalyst 19 is small, and the routine goes to step 97, where the desorption flag is set. Then, the processing cycle is ended.

When the desorption flag is set, the routine goes from step 90 to step 98, where the small valve opening CLU for the upstream valve 83 is calculated using the map shown in FIG. 10. In the following step 99, the opening DOPU of the upstream valve 83 is made equal to the CLU. At this time, the downstream valve 23 is kept fully open, and thus the pressure in the catalyst 19 is reduced. Accordingly, the adsorbed hydrocarbon is desorbed from the catalyst 19, and the absorbed $NO_X$ is released. In the following step 100, it is judged whether the predetermined time T1 has passed since the opening DOPU of the upstream valve 83 is made smaller, i.e., the pressure in the catalyst 19 is lowered. The predetermined time T1 is a time required for the actual absorbed $NO_X$ amount to be decreased from $UT(NO_X)$ to almost zero, and is obtained in advance by experiments. When the predetermined time T1 has not passed, the processing cycle is ended. Thus, the hydrocarbon adsorption and the $NO_X$ release of the catalyst 19 are continued. Contrarily, when the predetermined time T1 has passed, it is judged that the absorbed $NO_X$ amount becomes almost zero, and thus the routine goes to step 101, where the desorption flag is reset. In the following step 102, the adsorption flag is set.

When the desorption flag is reset and the adsorption flag is set, the routine goes from step 91 to step 103, where the small opening CLD for the downstream valve 23 is calculated using the map shown in FIG. 11. In the following step 104, the opening DOPU of the upstream valve 83 is made equal to the full open FL, and in the following step 105, the opening DOPD of the downstream valve 23 is made equal to CLD calculated in step 103. As a result, the pressure in the catalyst 19 increases. In the following step 106, the secondary fuel injection is performed by the constant amount h. The pressure in the catalyst increases at this time and the hydrocarbon by the secondary fuel injection is adsorbed in the catalyst 19. In the following step 107, the cumulative hydrocarbon amount S(HC) is calculated. In the following step 108, it is judged whether the cumulative hydrocarbon amount S(HC) is larger than the upper threshold UT(HC). The upper threshold UT(HC) represents a hydrocarbon amount required for purifying $NO_X$ released from the catalyst 19, i.e., $NO_X$ of the upper threshold $UT(NO_X)$. When $S(HC) \leq UT(HC)$, the processing cycle is ended. Namely, the hydrocarbon adsorption of the catalyst 19 is continued. Contrarily, when $S(HC) > UT(HC)$, the routine goes to step 109, where the adsorption flag is reset. In the following step 110, the secondary fuel injection is stopped. In the following step 111, the cumulative hydrocarbon amount S(HC) is cleared, and in the following step 112, the absorbed $NO_X$ amount $Q(NO_X)$ is cleared. Then, the processing cycle is ended.

In this way, in the present embodiment, hydrocarbon is kept adsorbed in the catalyst 19 during the usual engine operation. Thus, if an amount of $NO_X$ discharged from the engine drastically increases due to, for example, the transient engine operation, the large amount of $NO_X$ is sufficiently reduced by the hydrocarbon adsorbed in the catalyst 19.

In the present embodiment, when the absorbed $NO_X$ amount of the catalyst 19 becomes almost zero, the hydrocarbon desorption is stopped and the hydrocarbon adsorption is started. Alternatively, the amount of hydrocarbon adsorbed in the catalyst 19 may be obtained, and the hydrocarbon desorption may be stopped and the hydrocarbon adsorption may be started when the adsorbed hydrocarbon amount becomes almost zero. In this case, even if a certain amount of $NO_X$ remains absorbed in the catalyst 19 when the hydrocarbon adsorption is to be started, the $NO_X$ is released from the catalyst 19 and is reduced by hydrocarbon flowing the catalyst 19 when the hydrocarbon adsorption is in process. As a result, $NO_X$ is sufficiently reduced in this case.

Further, in the present embodiment, it is judged that the absorbed $NO_X$ amount is almost zero when the predetermined time T1 has passed since the hydrocarbon adsorption of the catalyst 19 starts. Alternatively, an amount of $NO_X$ released from the catalyst 19 per unit time in the reducing atmosphere may be obtained in advance, and the absorbed $NO_X$ amount may be estimated using the released $NO_X$ amount when the hydrocarbon desorption and the $NO_X$ release are in process. Note that the other structure and operation of the exhaust gas purifying device of the present embodiment are same as those of the above-mentioned embodiment, and thus the explanations thereof are omitted.

Figure 15:
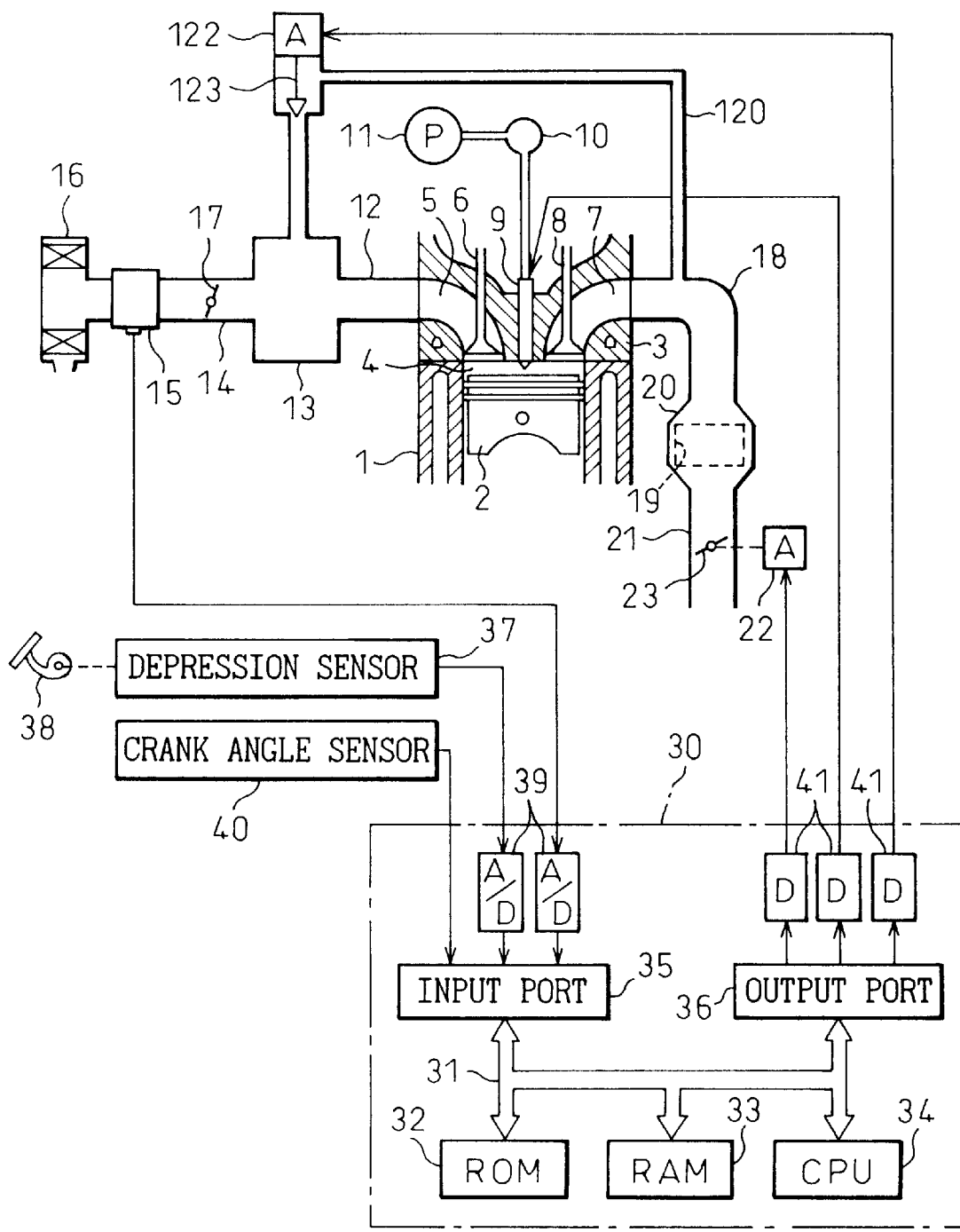
FIG. 15 is a general view of an engine according to another embodiment of the present invention.

FIG. 15 illustrates another embodiment of the present invention.

Referring to FIG. 15, the engine according to the present embodiment differs from that shown in FIG. 1 in that the exhaust manifold 18 and the surge tank 13 are connected to each other via an EGR (exhaust gas recirculation) passage 120, and in that an EGR control valve 123 is disposed in the EGR passage 120. The EGR control valve 123 is driven by an actuator 122 of electromagnetic or negative pressure type. The output port 36 of the ECU 30 is connected to the actuator 122 via a corresponding drive circuit 41, and the actuator 122 is controlled by output signals from the ECU 30.

Also, in the present invention, the hydrocarbon adsorption and the hydrocarbon desorption of the catalyst 19 are performed. When the pressure in the catalyst 19 is to be increased to adsorb hydrocarbon in the catalyst 19, the opening of the EGR valve 123 is made smaller and the opening of the exhaust gas control valve 23 is made smaller. The opening of the EGR valve 123 at this time is an opening suitable for increasing the pressure in the catalyst 9 sufficiently, while maintaining the increase of an amount of $NO_X$ discharged from the engine within a tolerable range, which increase of the discharged $NO_X$ amount will occur when the opening of the EGR valve 123 is made smaller. The opening of the exhaust gas control valve 23 at this time is suitable for increasing the pressure in the catalyst 19 sufficiently, while maintaining the decrease of the engine output within a tolerable range, which decrease of the engine output will occur when the back pressure of the engine increases by the small opening of the exhaust gas control valve 23.

On the other hand, when the pressure in the catalyst 19 is to be reduced to desorb hydrocarbon from the catalyst 19, the opening of the EGR valve 123 is made larger and the opening of the exhaust gas control valve 23 is made fully open. The opening of the EGR valve 123 at this time is an opening suitable for reducing the pressure in the catalyst 19 sufficiently, while maintaining the decrease of the stability of combustion within a tolerable range, which decrease of the stability of combustion will occur when the opening of the EGR valve 123 is made larger. When the opening of the EGR valve 123 is made larger, a part of the exhaust gas flowing the exhaust passage will escape from the exhaust passage. As a result, the pressure in the catalyst 19 is reduced without increasing the back pressure of the engine.

Alternatively, there may be provided a bypass passage connecting the exhaust manifold 18, which is upstream of the catalyst 19, and the exhaust pipe 21, which is downstream of the catalyst 19, bypassing the catalyst 19, and a bypass control valve disposed in the bypass passage may be controlled to control the pressure in the catalyst 19. Namely, when the pressure in the catalyst 19 is to be increased, the openings of the bypass control valve and the exhaust gas control valve 23 are made smaller, respectively. When the pressure in the catalyst 19 is to be reduced, the bypass control valve and the exhaust gas control valve 23 are made fully open, respectively. Note that the other structures and operations of the exhaust gas purifying device of the present embodiment are same as those of the above-mentioned embodiments, and thus the explanations thereof are omitted.

Figure 16:
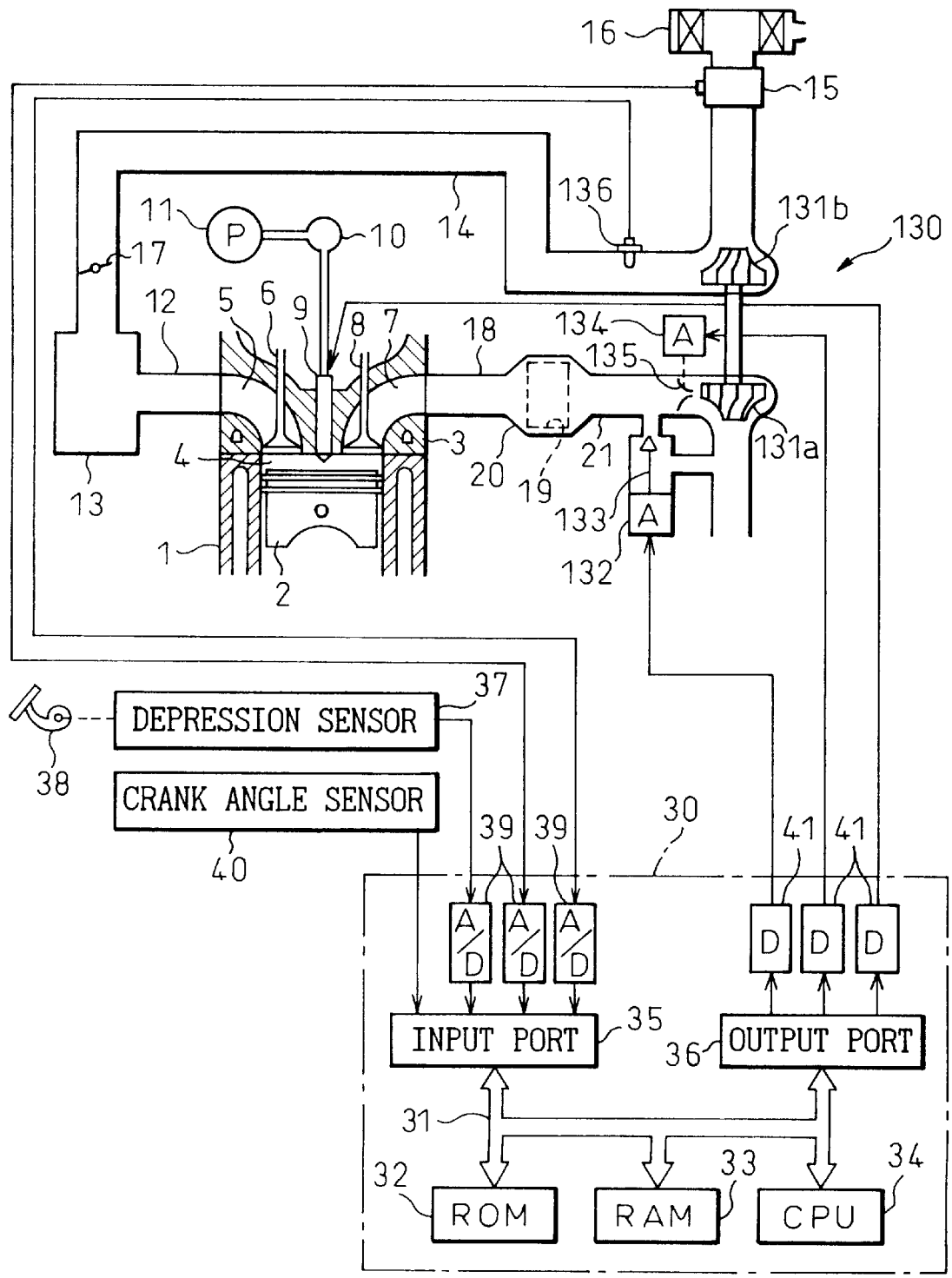
FIG. 16 is a general view of an engine according to another embodiment of the present invention.

FIG. 16 illustrates another embodiment of the present invention.

Referring to FIG. 16, the engine according to the present embodiment differs from that shown in FIG. 1 in that there is provided a supercharger of an exhaust gas driven type 130, without being provided with the exhaust gas control valve 23. Namely, a turbine 131a is disposed in the exhaust pipe 21, and a compressor 131b is disposed in the intake duct 14. The upstream side of the pipe 21 with respect to the turbine 131a and the downstream side of the pipe 21 are connected to each other via a waste gate valve 133 driven by an actuator 132. The waste gate valve 133 is opened when the supercharging pressure increases extremely. Further, a variable nozzle 135, of which opening area is variable, is disposed in the upstream side of the pipe 21, and is driven by an actuator 134. The output port 36 of the ECU 30 is connected to the actuators 132 and 134 via the corresponding drive circuits 41, and the actuators 132 and 134 are controlled by output signals from the ECU 30, respectively.

Also, in the present invention, the hydrocarbon adsorption and the hydrocarbon desorption of the catalyst 19 are performed. When the pressure in the catalyst 19 is to be increased to adsorb hydrocarbon in the catalyst 19, the opening of the waste gate valve 133 is made smaller and the opening of the nozzle 135 is made smaller. The small opening of the waste gate valve 133 decreases the amount of the exhaust gas bypassing the turbine 131a, and increases the pressure in the catalyst 19. The small opening of the nozzle 135 increases the flow resistance thereof, and also increases the pressure in the catalyst 19. The openings of the waste gate valve 133 and the nozzle 135 at this time are openings suitable for increasing the pressure in the catalyst 19 sufficiently, while maintaining the decrease of the engine output within a tolerable range, which decrease of the engine output will occur when the back pressure of the engine increases.

On the other hand, when the pressure in the catalyst 19 is to be reduced to desorb hydrocarbon from the catalyst 19, the openings of the waste gate valve 133 and the nozzle 135 are made larger, respectively. The large opening of the waste gate valve 133 increases the amount of the exhaust gas bypassing the turbine 131a, and reduces the pressure in the catalyst 19. The large opening of the nozzle 135 decreases the flow resistance thereof, and also reduces the pressure in the catalyst 19. The openings of the waste gate valve 133 and the nozzle 135 at this time are openings suitable for reducing the pressure in the catalyst 19 sufficiently, while maintaining the decrease of the supercharging pressure within a tolerable range. Note that the other structures and operations of the exhaust gas purifying device of the present embodiment are same as those of the above-mentioned embodiments, and thus the explanations thereof are omitted.

According to the present invention, it is possible to provide an exhaust gas purifying device capable of increasing an amount of hydrocarbon adsorbed in the catalyst and that desorbed from the catalyst, to thereby purify $NO_X$ sufficiently.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purifying device for an engine having an exhaust passage, comprising:

an exhaust gas purifying catalyst arranged in the exhaust passage, the catalyst capable of reducing $NO_X$ in the catalyst in the oxidizing atmosphere, and comprising a reducing agent adsorbent adsorbing a reducing agent in the inflowing exhaust gas therein when the pressure in the adsorbent becomes higher, and desorbing the adsorbed reducing agent therefrom when the pressure in the adsorbent becomes lower;

a reducing agent feeding means for feeding a reducing agent to the catalyst; and pressure control means for controlling the pressure in the catalyst, wherein the pressure control means increases the pressure in the catalyst to adsorb the reducing agent in the catalyst, and reduces the pressure in the catalyst to desorb the adsorbed reducing agent from the catalyst, and wherein $NO_X$ is reduced by the reducing agent in the catalyst.

2. An exhaust gas purifying device according to claim 1, wherein the amount of the reducing agent to be fed to the catalyst when the pressure increasing by the pressure control means is performed is made larger than that when the pressure increasing by the pressure control means is stopped.

3. An exhaust gas purifying device according to claim 2, wherein the feeding of the reducing agent is stopped when the pressure increasing by the pressure control means is stopped.

4. An exhaust gas purifying device according to claim 1, wherein the pressure increasing by the pressure control means is performed when the engine load is lower than a predetermined load or the engine speed is lower than a predetermined speed.

5. An exhaust gas purifying device according to claim 4, wherein the pressure increasing by the pressure control means is performed when the engine load is lower than the predetermined load and the engine speed is lower than the predetermined speed.

6. An exhaust gas purifying device according to claim 1, wherein a cumulative amount of the reducing agent fed to the catalyst during the pressure increasing by the pressure control means is obtained, and wherein the pressure increasing by the pressure control means is stopped when the cumulative reducing agent amount becomes larger than a predetermined amount.

7. An exhaust gas purifying device according to claim 1, wherein the pressure reducing by the pressure control means is performed for a predetermined time.

8. An exhaust gas purifying device according to claim 1, wherein the catalyst comprises a $NO_X$ absorbent absorbing $NO_X$ in the inflowing exhaust gas therein when the oxygen concentration in the inflowing exhaust gas is high, and releases the absorbed $NO_X$ therefrom when the oxygen concentration in the inflowing exhaust gas becomes lower, and wherein an amount of $NO_X$ absorbed in the $NO_X$ absorbent is obtained, and the pressure control means controls the pressure in the catalyst in accordance with the absorbed $NO_X$ amount.

9. An exhaust gas purifying device according to claim 8, wherein the pressure increasing and the pressure reducing by the pressure control means are stopped when the absorbed $NO_X$ amount is smaller than a predetermined amount.

10. An exhaust gas purifying device according to claim 8, wherein the amount of the reducing agent to be fed to the catalyst is controlled in accordance with the absorbed $NO_X$ amount.

11. An exhaust gas purifying device according to claim 10, wherein the feeding of the reducing agent is stopped when the absorbed $NO_X$ amount is smaller than a predetermined amount.

12. An exhaust gas purifying device according to claim 8, wherein the catalyst is comprised of at least one substance selected from alkali metals such as potassium, sodium, lithium, and cesium, alkali earth metals such as barium and calcium, rare earth metals such as lanthanum and yttrium, and transition metals such as iron, copper, cobalt, and nickel, and of precious metals such as palladium, platinum, rhodium, and iridium, which are carried on a porous carrier.

13. An exhaust gas purifying device according to claim 1, wherein the pressure control means comprises a first exhaust gas control valve disposed in the exhaust passage downstream of the catalyst, and wherein the opening of the first valve is made smaller when the pressure increasing is to be performed, and is made larger when the pressure reducing is to be performed.

14. An exhaust gas purifying device according to claim 13, wherein the pressure control means further comprises a second exhaust gas control valve disposed in the exhaust passage upstream of the catalyst, and wherein the opening of the second valve is made larger when the pressure increasing is to be performed, and the opening of the second valve is made smaller when the pressure reducing is to be performed.

15. An exhaust gas purifying device according to claim 1, wherein the pressure control means comprises an exhaust gas leaking passage branching off from the exhaust passage upstream of the catalyst, and wherein the pressure in the catalyst is controlled by controlling the amount of the exhaust gas flowing through the leaking passage.

16. An exhaust gas purifying device according to claim 15, wherein the leaking passage comprises an EGR passage connecting the exhaust passage upstream of the catalyst and an intake passage of the engine to each other, and an EGR control valve disposed in the EGR passage, and wherein the pressure in the catalyst is controlled by controlling the opening of the EGR valve.

17. An exhaust gas purifying device according to claim 1, wherein a turbine of a supercharger of exhaust gas driven type is disposed in the exhaust passage downstream of the catalyst, and wherein the pressure control means controls the amount of the exhaust gas to be introduced the turbine to control the pressure in the catalyst.

18. An exhaust gas purifying device according to claim 17, wherein the exhaust gas amount control means comprises a waste gate valve disposed in a bypass passage connecting, bypassing the turbine, the exhaust passage between the catalyst and the turbine and the exhaust passage downstream of the turbine to each other, and wherein the opening of the waste gate valve is controlled to control the pressure in the catalyst.

19. An exhaust gas purifying device according to claim 17, wherein the exhaust gas amount control means comprises a variable nozzle, disposed in the exhaust passage between the catalyst and the turbine for introducing the exhaust gas to the turbine, the opening area of the nozzle being variable, and wherein the opening of the nozzle is controlled to control the pressure in the catalyst.

20. An exhaust gas purifying device according to claim 1, wherein the engine has a fuel injector arranged in a combustion chamber thereof for injecting fuel to the combustion chamber directly, and wherein the reducing agent feeding means controls the fuel injector to inject fuel of the engine as the reducing agent at the combustion stroke or the exhaust stroke of the engine when the reducing agent is to be fed the catalyst.

21. An exhaust gas purifying device according to claim 1, wherein the $NO_x$ catalyst is comprised of a precious metal, such as platinum, palladium, rhodium, and iridium, or a transition metal, such as iron, copper, cobalt, and nickel, which is carried on a porous carrier.

22. An exhaust gas purifying device according to claim 1, wherein the catalyst is comprised of a porous carrier, such as zeolite, alumina, silica-alumina, activated carbon, and titania.

23. An exhaust gas purifying device according to claim 1, wherein the air-fuel mixture is burned in a combustion chamber of the engine with an excess of air.

24. An exhaust gas purifying device according to claim 1, wherein an amount of the catalytic element carried on a carrier of the catalyst at a position near the downstream end of the catalyst is larger than that at a position far from the downstream end of the catalyst.

* * * * *